July 22, 1941.  C. M. ROE  2,249,981

PACKING FOR STUFFING BOXES AND THE LIKE

Filed June 15, 1939

INVENTOR.
Chester M. Roe
BY Clark & Ott
ATTORNEYS

Patented July 22, 1941

2,249,981

UNITED STATES PATENT OFFICE 2,249,981

PACKING FOR STUFFING BOXES AND THE LIKE

Chester M. Roe, Hasbrouck Heights, N. J.

Application June 15, 1939, Serial No. 279,310

2 Claims. (Cl. 288—12)

This invention relates to packings and has particular reference to an improved packing of annular formation for insertion between a pair of spaced members such as in a stuffing box, packing gland and the like, in surrounding relation to the shaft extending therethrough and aims to provide a continuous smooth metallic sheathing surrounding the shaft which will retain and seal within the stuffing box the plastic fibrous material forming the body of the packing, while permitting the said plastic fibrous material to flow between the portions of the adjacent convolutions of the sheathing on the outer periphery and side faces thereof so as to completely fill all voids in the stuffing box.

The invention has further reference to a packing of annular formation and of rectangular shape in cross sectional configuration consisting of a body of plastic fibrous material of a character which flows under pressure and which body is encased by a porous flexible tubing with a flattened metallic sheathing consisting of an asbestos core and a metal foil covering surrounding the porous tubing, the sheathing being spirally arranged thereon with the portions of the adjacent convolutions on the outer periphery thereof disposed in spaced relation and with portions of the adjacent convolutions on the inner periphery thereof disposed in abutting relation to provide a continuous smooth metallic periphery adapted to surround the shaft to thereby retain the plastic fibrous material within the stuffing box while permitting the plastic fibrous material to flow between the portions of the adjacent convolutions of the sheathing on the outer periphery thereof to fill all voids within the stuffing box.

The invention also comprehends the method of producing a packing of the indicated character which consists in extruding the plastic fibrous material in a continuous elongated body or core and encasing the same as it is extruded in a porous flexible tubular jacket by braiding or otherwise weaving the jacket thereon, spirally winding upon the jacketed core a flexible sheathing element consisting of a metal foil strip enclosing a stranded asbestos core with adjacent convolutions of the sheathing element spaced apart, compressing the assemblage into rectangular form in cross sectional configuration so that the sheathing element is flattened upon the faces of the jacketed core with the edges of adjacent convolutions of said element spaced apart, and winding the compressed assemblage into coiled formation so that the portions of the adjacent convolutions of the sheathing element on the convex or outer periphery thereof are disposed in spaced relation and the portions of the adjacent convolutions thereof on the concave or inner periphery are disposed in abutting relation.

With the foregoing and other objects in view, reference is made to the following specification and the accompanying drawing, in which there is disclosed the preferred embodiment of the invention.

Figure 1:
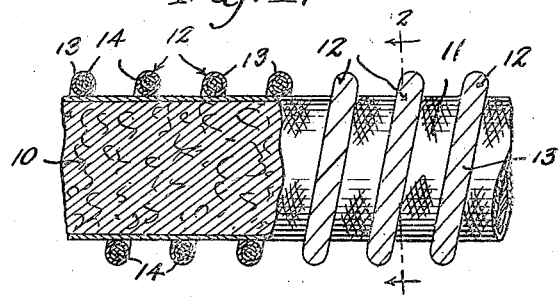
Fig. 1 is an enlarged fragmentary side view of the packing with a part broken away and shown in section and prior to the compression of the same into rectangular cross sectional configuration.

Referring to the drawing by characters of reference the packing includes a continuous elongated plastic fibrous core 10 composed of asbestos fiber and powdered graphite which are intermixed and bonded together by an adhesive material into a homogeneous plastic mass. The core 10 is of annular or coiled formation consisting of one or more convolutions of rectangular shape in cross sectional configuration and the same is encased in a porous flexible covering or jacket 11 such as a braided or woven tubular fabric.

A continuous elongated flattened sheathing element 12 is spirally or helically arranged upon the jacketed core with the portions of adjacent convolutions thereof on the convex or outer periphery of the core disposed in substantially equidistantly spaced relation and with the portions of adjacent convolutions of the sheathing element on the concave or inner periphery of the jacketed core disposed with their adjacent edges in abutting relation. The portions of the convolutions on the opposite side faces of the jacketed core are disposed radially and thereby provide tapered spaces between the side edges of adjacent convolutions.

Figure 7:
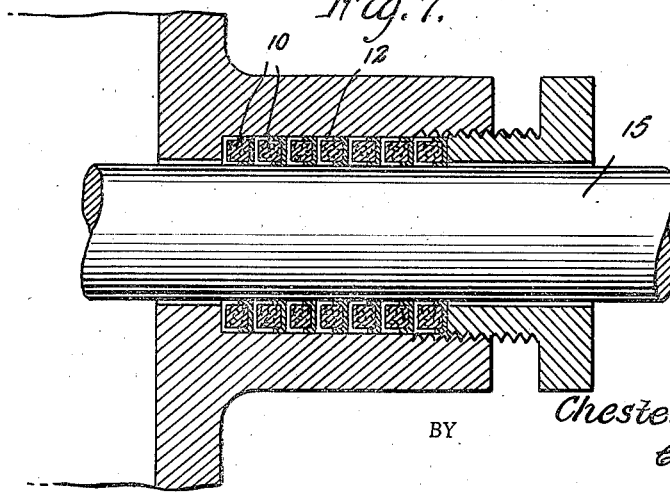
Fig. 7 is a sectional view through a bearing box illustrating the packing in position therein.

The sheathing element 12 consists of a flattened metal foil casing 13 surrounding and completely enclosing a stranded asbestos core 14 and said casing preferably consists of a metal foil strip composed of an alloy of antimony and lead, the strip being spirally or helically wound upon the stranded asbestos core with the edges of adjacent convolutions of the strip disposed in overlapping relation. The asbestos core consists of one or more twisted strands of asbestos fiber which with the metal foil covering provides a tenacious ductile armored sheathing element surrounding the jacketed plastic fibrous core 10. The plastic fibrous core 10 being composed of comminuted material, readily flows under pressure as when the packing is arranged in a stuffing box in surrounding relation with the shaft 15 therein, as illustrated in Fig. 7 of the drawing. The sheathing element 12 having adjacent portions of the convolutions on the inner periphery of the packing disposed with their edges in abutting relation, provides a continuous smooth metallic periphery which completely surrounds the shaft 15 and which functions to retain the plastic fibrous material within the confines of the stuffing box, while permitting the said material to flow through the porous jacket 11 and through the spaces between the portions of the adjacent convolutions of the sheathing element 12 at the outer periphery and at the opposite sides thereof.

The packing is produced by forcing or extruding the plastic fibrous material through a substantially circular opening to produce the continuous elongated core 10 of substantially circular formation in cross section and which core is encased in the porous flexible tubular jacket 11 as the same is extruded by braiding or otherwise weaving the same thereon.

Figure 2:
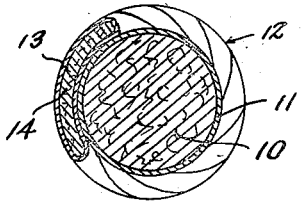
Fig. 2 is a cross sectional view taken approximately on line 2—2 of Fig. 1.
Figure 3:
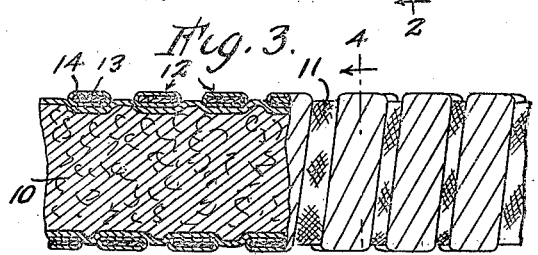
Fig. 3 is a view similar to Fig. 1 illustrating the packing compressed to rectangular cross sectional configuration.
Figure 4:
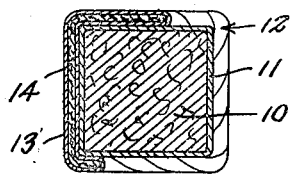
Fig. 4 is a vertical sectional view taken approximately on line 4—4 of Fig. 3.
Figure 5:
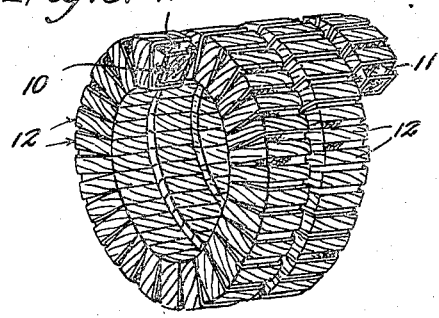
Fig. 5 is a fragmentary perspective view on a reduced scale of the finished packing in coiled form ready for use.
Figure 6:
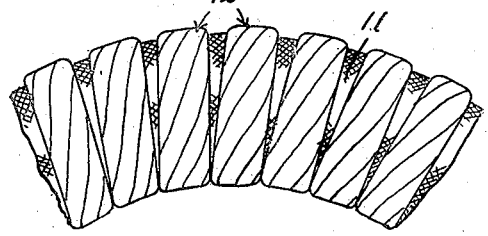
Fig. 6 is an enlarged fragmentary side view of the packing as shown in Fig. 5.

The sheathing element 12 is preformed by spirally winding the metal foil strip upon the stranded asbestos core 13 with the edges of adjacent convolutions of the strip disposed in overlapping relation. The sheathing element which is then of continuous formation and of substantially circular shape in cross section is then spirally or helically wound upon the jacketed core 10 with adjacent convolutions of the sheathing element disposed in equi-distantly spaced relation as illustrated in Figs. 1 and 2 of the drawing. The assemblage is then compressed between rollers or by other suitable means to convert the jacketed core 10 from the circular formation shown in Figs. 1 and 2 to the rectangular form shown in Figs. 3 and 4. In thus compressing the assemblage the portions of the convolutions of the sheathing element 12 are flattened against the faces of the jacketed core and partially counter-sunk into the core while the side edges of the portions of the flattened sheathing element remain in spaced relation as shown in Figs. 3 and 4. The assemblage is then helically or spirally wound upon a mandrel or other forming implement to produce the finished packing as illustrated in Figs. 5, 6 and 7 of the drawing. The mandrel or forming implement is of such diameter that the portions of the convolutions of the sheathing element extending across the inner peripheral face of the packing are compressed so that the edges of said portions are disposed in abutting relation, while the edges of the portions extending across the outer periphery and opposite side faces are spaced apart.

The packing being produced in spiral formation may be severed as desired for insertion in stuffing boxes and the like in surrounding relation with the shaft therein and when compressed by the tightening of the nut, produces a radial inward contraction of the said sheathing element about the shaft to cause the said portions of the sheathing element to hug the shaft, while the plastic material is free to flow through the spaces between the portions of the adjacent convolutions on the outer periphery and opposite side edges of the packing to fill all voids within the stuffing box.

What is claimed is:

1. In a packing of the character described, an annular plastic fibrous body of rectangular form in cross sectional configuration, a porous flexible tubing encasing the body and a flattened metallic sheathing strip consisting of a stranded asbestos core and a metal foil covering surrounding the core, said sheathing strip being spirally arranged upon the flexible tubing with the portions of adjacent convolutions thereof on the outer periphery of the tubing disposed in spaced relation for exposing the porous tubing between the adjacent convolutions on the said outer periphery, and with the portions of adjacent convolutions thereof on the inner periphery of the tubing disposed in abutting relation to provide a continuous smooth metallic inner peripheral surface.

2. A packing including an annular plastic fibrous body of rectangular form in cross sectional configuration, a porous flexible tubing encasing the body and a flattened metallic sheathing strip consisting of a stranded asbestos core and a metal foil covering spirally wound upon the asbestos core and said sheathing strip being spirally arranged upon and partially embedded in the surface of the flexible tubing with the portions of adjacent convolutions thereof on the outer periphery of the tubing disposed in spaced relation for exposing the porous tubing between the adjacent convolutions on the said outer periphery and with the portions of adjacent convolutions thereof on the inner periphery of the tubing disposed in abutting relation to provide a continuous smooth metallic inner periphery adapted to surround a shaft within a stuffing box and to retain therein the plastic fibrous body while permitting the said body to flow between the portions of adjacent convolutions of the sheathing on the outer periphery and opposite side faces thereof to fill all voids within the stuffing box.

CHESTER M. ROE.